US011457103B2

(12) United States Patent
Pasquale et al.

(10) Patent No.: US 11,457,103 B2
(45) Date of Patent: Sep. 27, 2022

(54) TELEPHONE SYSTEM WITH CUSTOMIZABLE ADVERTISING FUNCTIONALITIES

(71) Applicant: Unified Office, Inc., Nashua, NH (US)

(72) Inventors: Raymond Pasquale, Milford, NH (US); Thomas R. Phelan, Hopkinton, MA (US)

(73) Assignee: Unified Office, Inc., Nashua, NH (US)

( * ) Notice: Subject to any disclaimer, the term of this patent is extended or adjusted under 35 U.S.C. 154(b) by 212 days.

(21) Appl. No.: 17/030,476

(22) Filed: Sep. 24, 2020

(65) Prior Publication Data

US 2021/0099559 A1    Apr. 1, 2021

Related U.S. Application Data

(60) Provisional application No. 62/908,668, filed on Oct. 1, 2019.

(51) Int. Cl.
*H04M 1/02*    (2006.01)
*G06Q 30/02*   (2012.01)
*G09F 13/22*   (2006.01)

(52) U.S. Cl.
CPC ...... *H04M 1/0266* (2013.01); *G06Q 30/0241* (2013.01); *G09F 13/22* (2013.01); *G09F 2013/222* (2013.01)

(58) Field of Classification Search
CPC .. H04M 1/0266; G06Q 30/0241; G09F 13/22; G09F 2013/222
See application file for complete search history.

(56) References Cited

U.S. PATENT DOCUMENTS

| 6,587,835 | B1* | 7/2003 | Treyz | G06Q 30/0633 |
|---|---|---|---|---|
| | | | | 705/14.64 |
| 2002/0160817 | A1 | 10/2002 | Salmimaa | |
| 2004/0066931 | A1* | 4/2004 | Tankhiwale | H04M 3/42314 |
| | | | | 379/242 |
| 2007/0101004 | A1* | 5/2007 | Loen | H04M 1/2478 |
| | | | | 709/227 |
| 2010/0281374 | A1* | 11/2010 | Schulz | H04M 1/72469 |
| | | | | 715/830 |

(Continued)

FOREIGN PATENT DOCUMENTS

| EP | 2317737 | 5/2011 |
|---|---|---|
| WO | 2009/014498 | 1/2009 |

OTHER PUBLICATIONS

European Search Report for 20198769.0 dated Dec. 1, 2020.

*Primary Examiner* — Ernest G Tacsik
(74) *Attorney, Agent, or Firm* — Sheehan Phinney Bass & Green PA

(57) ABSTRACT

A system includes multiple in-room telephones (e.g., in the rooms of a hotel or the like) with integrated tablet-like touch displays in each one of multiple rooms, a computer-based server that is connected to the in-room telephones and interacts with the in-room telephones to provide configuration information to facilitate display of advertising information including, for example, logos, at the touch displays of the in-room telephones, and one or more computer control terminals connected to the computer-based server and operable to facilitate human control over various aspects of system operation including the advertising information displayed at the touch displays of the in-room telephones.

9 Claims, 8 Drawing Sheets

(56) References Cited

U.S. PATENT DOCUMENTS

| | | | | |
|---|---|---|---|---|
| 2011/0307341 A1* | 12/2011 | Zohar | ............... | H04M 7/003 |
| | | | | 705/14.73 |
| 2016/0078571 A1* | 3/2016 | Singh | ............. | G06Q 30/0633 |
| | | | | 705/14.66 |
| 2018/0095615 A1* | 4/2018 | Martier | ........... | H04N 21/26258 |
| 2020/0007951 A1* | 1/2020 | Ogle | ............ | H04N 21/44213 |

* cited by examiner

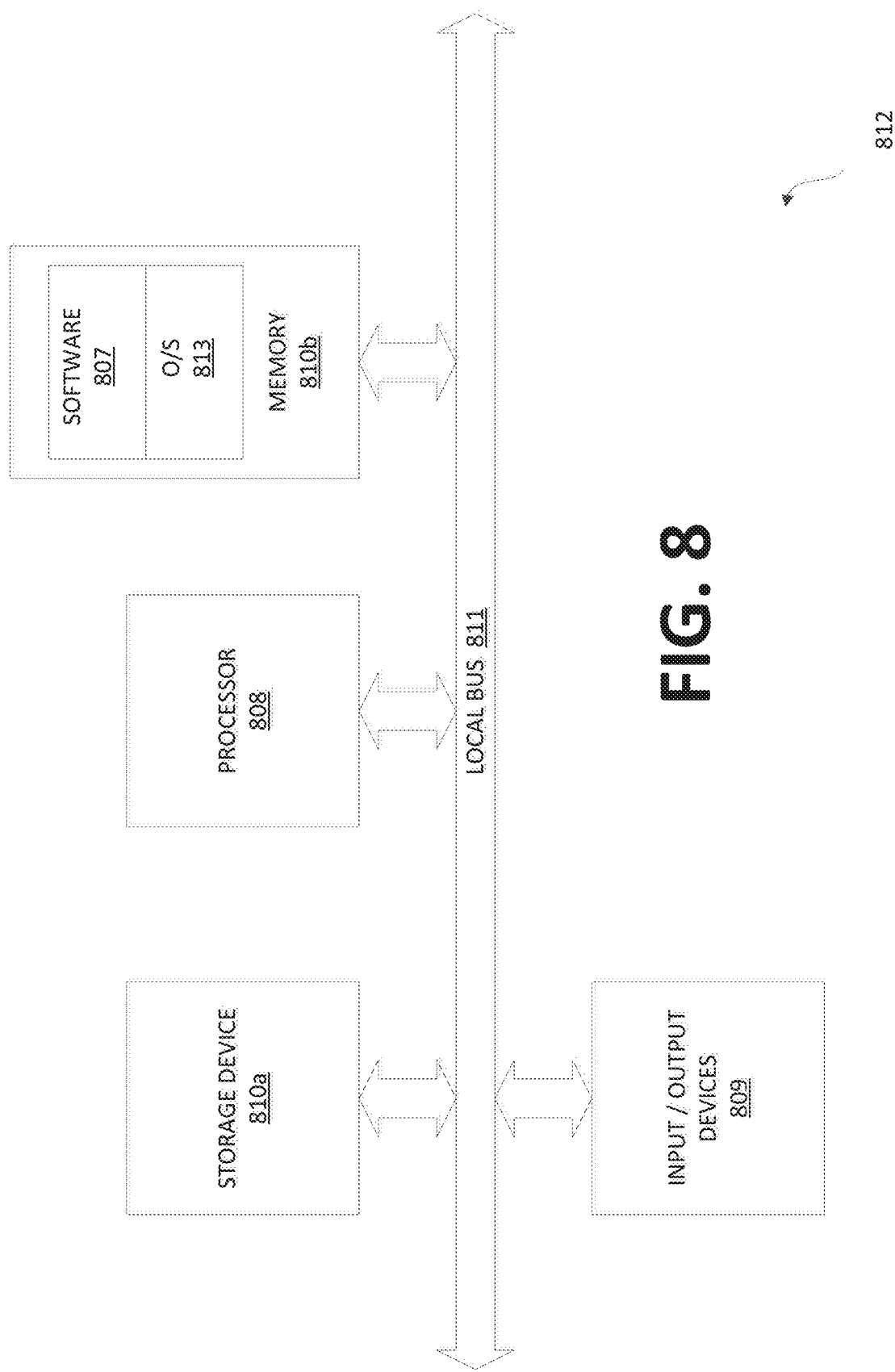

TELEPHONE SYSTEM WITH CUSTOMIZABLE ADVERTISING FUNCTIONALITIES

CROSS-REFERENCE TO RELATED APPLICATION(S)

This application claims the benefit of priority to U.S. Provisional Patent Application No. 62/908,668, entitled TELEPHONE SYSTEM WITH CUSTOMIZABLE ADVERTISING FUNCTIONALITIES, which was filed on Oct. 1, 2019. The disclosure of the prior application is incorporated by reference herein in its entirety.

FIELD OF THE INVENTION

This disclosure relates to a telephone system and, more particularly, to a telephone system that includes customizable advertising functionalities for use in a hotel room, for example.

BACKGROUND

Hotels are required to provide telephones in their rooms so that the guests can dial an emergency telephone number (e.g., 911 in the United States), contact hotel services, and/or make outside telephone calls. Hotels typically charge guests for making outside calls and historically this was a significant revenue source for hotels. With the advent of cell phones, however, guests rarely use room telephones for outside calls and the revenue that hotels see from use of room telephones has declined to close to zero. Hotels still provide room telephones, at least so that guests can dial an emergency number and so that guests can reach hotel services. However, such room telephones have become a cost to hotels—to be minimized—rather than a revenue source to hotels—to be maximized.

SUMMARY OF THE INVENTION

In one aspect, a system includes multiple in-room telephones (e.g., in the rooms of a hotel or the like) with integrated tablet-like touch displays in each one of multiple rooms, a computer-based server that is connected to the in-room telephones and interacts with the in-room telephones to provide configuration information to facilitate display of advertising information including, for example, logos, at the touch displays of the in-room telephones, and one or more computer control terminals connected to the computer-based server and operable to facilitate human control over various aspects of system operation including the advertising information displayed at the touch displays of the in-room telephones.

In another aspect, a method (that may be implemented in the foregoing system) includes displaying logos for associated local businesses at the touch displays of the in-room telephones, receiving an indication that one of the logos being displayed at the touch display of a particular one of the in-room telephones has been touched, and providing a different page or screen at the touch display that has been touched, wherein the different page or screen corresponds to the business associated with the touched logo and has a telephone number for the associated business or a button that can be touched by a human user to call the associated business.

In some implementations, one or more of the following advantages are present.

The system(s) and technique(s) disclosed herein help return in-room hotel telephone phones to revenue generation (e.g., by adding an interactive advertising display to room phones). The system(s) and technique(s) do this in a manner that involves the hotel staff and that can help local businesses that might end up with more traffic by virtue of being featured on the touch displays of the in-room telephones.

Other features and advantages will be apparent from the description and drawings, and from the claims.

BRIEF DESCRIPTION OF THE DRAWINGS

FIG. 8 is a schematic representation of an exemplary computer-based memory and processing system.

Like reference characters refer to like elements.

DETAILED DESCRIPTION

Figure 1:
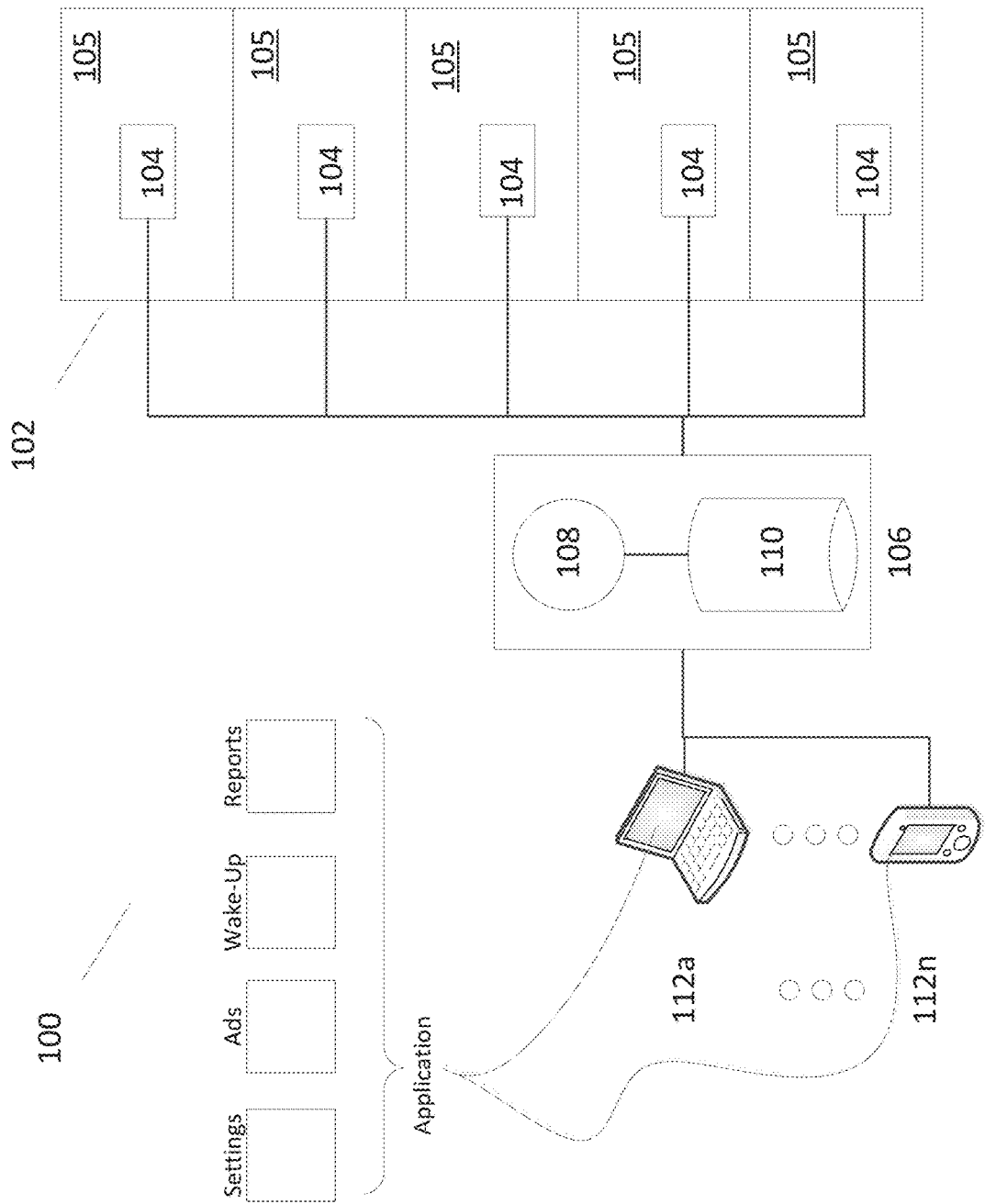
FIG. 1 is a schematic representation of a telephone system for a hotel.

FIG. 1 is a schematic representation of a telephone system 100 for a hotel 102. The telephone system 100 includes a telephone 104 (e.g., a Voice over Internet Protocol, or "VoIP," telephone with an integrated tablet-like touch display) in each room of the hotel 102. As disclosed herein in detail, the system 100 is configured to help increase the amount of revenue the hotel 102 see from providing in-room telephone service to hotel guests. In this regard, each room telephone 104 features a screen with an advertising display that hotel staff can configure to feature local businesses, for example, and that hotel guests can interact with from their hotel rooms. In a typical implementation, the local businesses might pay a fee to be featured on the interactive telephone displays in the hotel guest rooms and at least a portion of those fees may be directed to the hotel as revenue.

In addition to the in-room 105 telephones 104, the system 100 includes a local computer-based server 106 that is connected to the room telephones 104 and that interacts with the room telephones 104 to provide configuration information and control for the advertising display in addition to telephony services.

The local server 106 is connected to the room telephones 104 by a communication network. The communication network can have any one of a variety of possible configurations. For example, the communication network can be hard-wired, wireless network, or a combination of the two. The local server 106 may, or may not, be physically located on premises (e.g., in the hotel building or on the campus of the hotel). In a typical implementation, however, the local server 106 is server that is dedicated to the telephones in one specific hotel (e.g., hotel 102 in FIG. 1) and no other hotels.

The local server 106, in the illustrated implementation, has a computer-based processor 108 and computer-based memory 110. In a typical implementation, the memory 110 stores program(s) and/or data that facilitate at least some of the functionalities described herein, particularly those attributable to the room telephones 104. The server 106 also has network connections that enable the server to communicate with system components that are external to the server 106, including the room telephones, as well as computer control terminals 112a . . . 112n where the hotel staff, for example, can control and/or configure various aspects of system operation.

The system 100 also includes the computer control terminals 112a . . . 112n, which are connected to the server 106. The computer control terminals 112a . . . 112n may be fixed (e.g., kept in the hotel or in a room dedicated to the hotel) or mobile (e.g., as a mobile device that belongs to a hotel staff member). In some instances, one or more of the computer control terminals 112a . . . 112n are physically located on the hotel premises (e.g., in the hotel building or on the campus of the hotel). In the illustrated implementation, all of the computer control terminals 112a . . . 112n are hotel-specific, meaning that they are connected to and dedicated to the server 106 (and to the overall telephone system 100) for one specific hotel (i.e., hotel 102 in FIG. 1). In other words, none of the computer control terminals 112a . . . 112n in system 100 are, or would be, connected to or able to interact with servers (like server 106) in other hotels (that are not hotel 102), and none of the computer control terminals 112a . . . 112n are programmed or configured to facilitate control or configuration of telephones in other hotels (that are not hotel 102).

In some implementations, each computer control terminal 112a . . . 112n executes an interactive computer software application (e.g., a web app) that enables hotel staff, for example, to control and/or configure various aspects of system operation including, for example, the advertising display and phone operation. In a typical implementation, the interactive web application allows the hotel staff to configure and control the advertising display as well as phone operation. In one exemplary implementation, the apps on the computer control terminals 112a . . . 112n are configured to present a variety of different functionalities to a hotel staff member including, for example, functionalities related to: telephone settings 114, telephone advertisements 116, guest wake-up calls 118, and/or reports on phone usage, etc. 120. Of course, in various implementations, one or more other functionalities may be available to hotel staff at the computer control terminals 112a . . . 112n.

Figure 2:
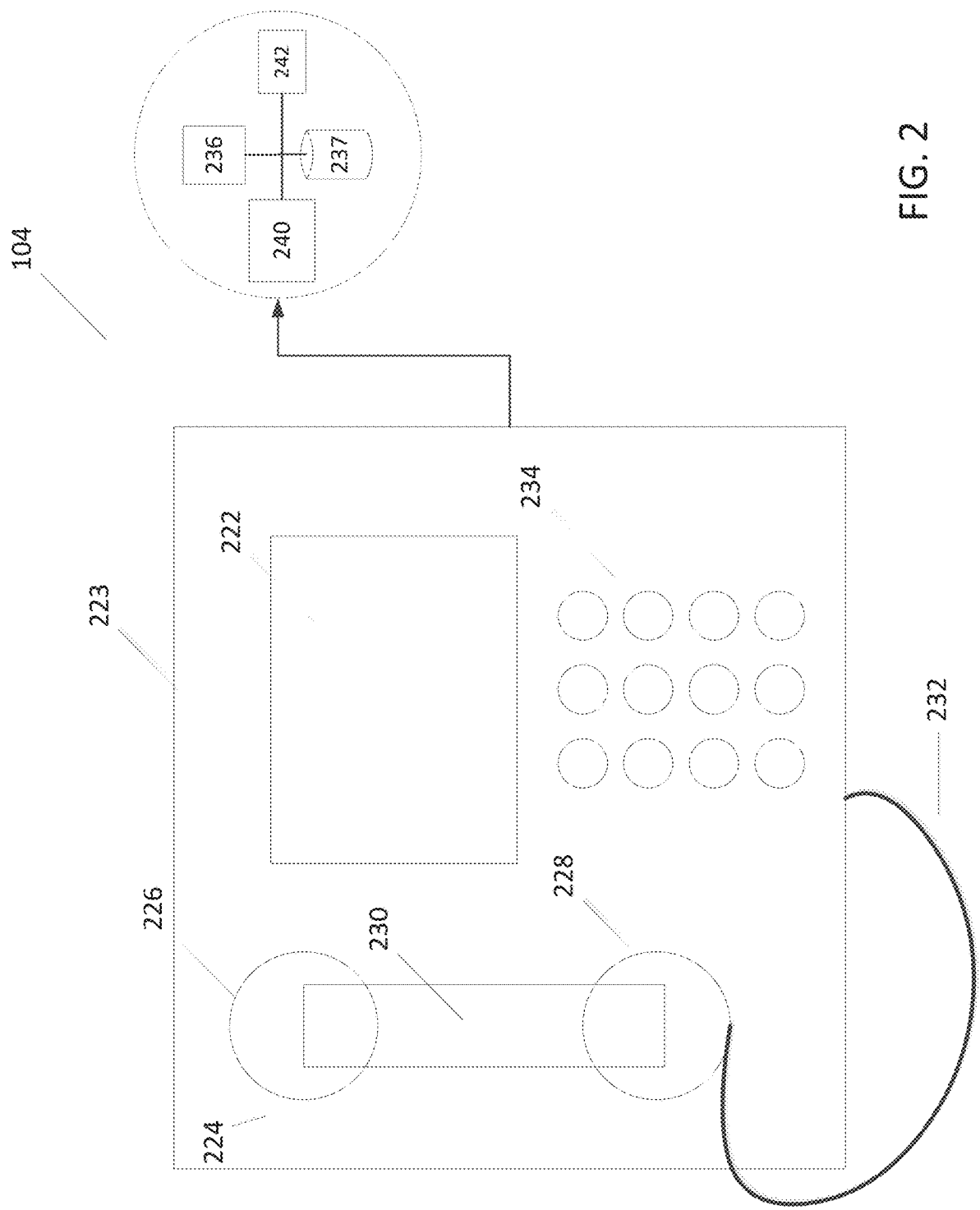
FIG. 2 is an example of one of the room telephones in the system of FIG. 1.

FIG. 2 shows an example of one of the room telephones 104 in the system 100 of FIG. 1.

The room telephone 104, in the illustrated implementation, is a Voice over Internet Protocol (VoIP) telephone with an integrated tablet-like touch display 222.

The VoIP telephone 104 has a housing 223 and a handset 224 that sits in a cradle defined by the housing 223. The handset 224 has a speaker 226 and a microphone 228 that are connected together at opposite ends of a handle 230. The handset 224 is connected, via a telephone wire 232 to telephony circuitry inside the housing 223 of the VoIP telephone 104. The integrated tablet-like touch display 222 is exposed at an external upper surface of the housing 223 of the telephone 104. There is also an optional keypad 234 exposed at the external upper surface of the housing 223. In a typical implementation, hotel guests can use the keypad 234 and/or the touch display 222 to enter phone numbers into the telephone 104. Hotel guests also can interact with the touch display 222 for other reasons and the touch display 222 can provide valuable information (such as recommended local restaurants, or the like) to hotel guests too.

Internally, the VoIP telephone 104 has a computer-based processor 236, a computer-based memory 237, an analog-to-digital and digital-to-analog converter 240, and a network interface 242. In a typical implementation, the processor 236 is configured to perform general-purpose macro-processing functionalities as well as voice engine and/or digital signal processing (e.g., to process real-time transport protocol messages). The network interface 242 may be, for example, Ethernet or wireless network hardware to send and receive messages over a data network. In some implementations, the VoIP phones 104 also include an RJ-11 port, for example, to connect the phone to a public switched telephone network.

The VoIP telephones 104 can have one or a variety of possible design configurations and physical appearances, within the parameters described herein. In a typical implementation, however, they are telephones that are made available to the hotel guests by the hotel. Typically, they are not mobile devices and do not belong to (i.e., they are not owned by) the hotel guests.

When the system 100 is operational, the touch display 222 on each in-room telephone 104 can show any one of a variety of different screens—having different appearances and offering up different functionalities to the hotel guests that view and/or interact with the in-room telephones 104 (e.g., by touching the touch display 222). Moreover, in a typical implementation, when the telephone 104 in a particular room is idle (i.e., not currently being used), the touch display 222 on a particular in-room telephone 104 may cycle through advertisements, for example, that are being displayed on the touch display 222.

Figure 3:
FIG. 3 is an example of a home screen that might appear on a touch display of the in-room telephone of FIG. 2.

FIG. 3 shows an example of a home screen that might appear on the touch displays 222 of the in-room telephones 104 in system 100. In a typical implementation, this home screen, which displays advertisement graphics that have been configured by the hotel staff, might appear on the touch display when a phone is in a resting state.

The home screen has a header, which appears on every screen that the touch display shows, that identifies the hotel ("Albion Hotel") and room number ("Room 202") where the telephone 104 is located, the current local time ("09:34") and that has four labeled icons, respectively labeled "Home," "Dial," "Services," and "Wake Up." Each of these labeled icons is a hyperlink to another page, or screen, that the system 100 can present at the touch display 222. So, if the hotel guest, for example, touches the touch display 222 where one of those labeled icons is located, the system 100 will present to the hotel guest a different page or screen that corresponds to the functionality associated with the labeled icon the hotel guest touched.

Below the header on the home screen of FIG. 3, there is a body section of the screen with six logos, each of which corresponds to a business (e.g., a restaurant) that is local to hotel 102. Each logo on the screen is a hyperlink to a different page or screen that corresponds to the business associated with the logo the hotel guest touched. So, if the hotel guest, for example, touches the touch display 222 where one of those logos is located, the system 100 will present to the hotel guest a different page or screen that corresponds to the business the hotel guest touched. In some implementations, the system 100, in response to the hotel guest touching one of the logos, presents at the touch display 222, a website for the business associated with the logo that the hotel guest touched. In some implementations, the system 100, in response to the hotel guest touching one of the logos, presents at the touch display 222 an information page (not a website run by the business) that may include contact (and other) information about the business associated with the logo that the hotel guest touched.

The logos on the home screen of FIG. 3 are arranged in an array having two rows and three columns. Of course, other logo configurations are possible including other array configurations having more or fewer rows and/or columns than shown in the home screen of FIG. 3, or other configurations where the logos are more randomly arranged not in an array. Moreover, the individual logos can vary considerably and, in some instances, may be nothing more than the name the business or the address of the website for the business, without the type of decorative aspects of the logos shown in the screen of FIG. 3. In any event, as mentioned above, the logos—whether decorative or not—are hyperlinks to a different pages or screens that corresponds to the business associated with the logo the hotel guest touched.

In a typical implementation, when a hotel guest touches a particular one of the logos on the home screen of FIG. 3, the system 100 causes the touch display 222 to navigate to a page/website associated with the business that corresponds to the selected logo. The website may be one that is owned by the business (e.g., if the business owns a website). Alternatively, the website may be a review page for the business on a business directory service with a crowd-sourced review forum, such as Yelp.com or the like. Alternatively, the website may be simply an information page for the business, hosted locally by the hotel (e.g., on server 106) that includes, for example, a brief description of the business and/or basic contact information (telephone number, email address, etc.) for the business. Regardless, in a typical implementation, the website that the system 100 navigates to when the hotel guest touches a particular logo includes at least some information about the business that will enable the hotel guest to learn more about the business and potentially contact the business (for reservations, visiting, etc.).

In a typical implementation, the touch display 222 on each in-room telephone 104 shows a home screen (like the one in FIG. 3) whenever that in-room telephone 104 is idle (i.e., not in use and not just used). Moreover, after a period of use by a hotel guest, for example, the touch display 222 on a particular in-room telephone 104 typically cycles back to the home screen, after some predetermined amount of idle time (e.g., between 3 and 10 seconds or so). Additionally, if the touch display 222 is presenting a screen than the home screen and the hotel guest, for example, touches the icon labeled "home" on the header of the different screen, the touch display 222 cycles back to the home screen without any deliberate delay introduced by the system 100.

In a typical implementation, hotel staff can use one or more of the computer control terminals 112a . . . 112n to configure the system 100 so that any number of logos will be displayed on the touch displays 222 of the in-room telephones 104. In some implementations, if hotel staff has entered into the system 100 more logos than the maximum number of logos that a particular telephone 104 is configured to display, the system 100, through a software application running on the telephone 104, will periodically swap logos in and out of the touch display 222. For example, if the telephone 104 is configured to display no more than six logos at a given time (see, e.g., FIG. 3), but hotel staff has entered into the system 100 twelve different logos (and other information for the associated businesses), then, typically, the telephones in that system 100 would show only six logos at any given time, but swap new logos in and out so that over some set period of time, all twelve logos will get displayed on the touch display 222 for an equal amount of time (+/−5%). In some implementations, hotel staff may configure the system 100 so that some of the logos entered into the system 100 get a greater amount of display time than others. In a typical implementation, the hotel staff can configure any number of graphics to be displayed. If there are more than some set maximum amount that can be displayed at one time (e.g., more than six), the application running on the room phone will periodically replace a graphic with the next one.

Figure 4:
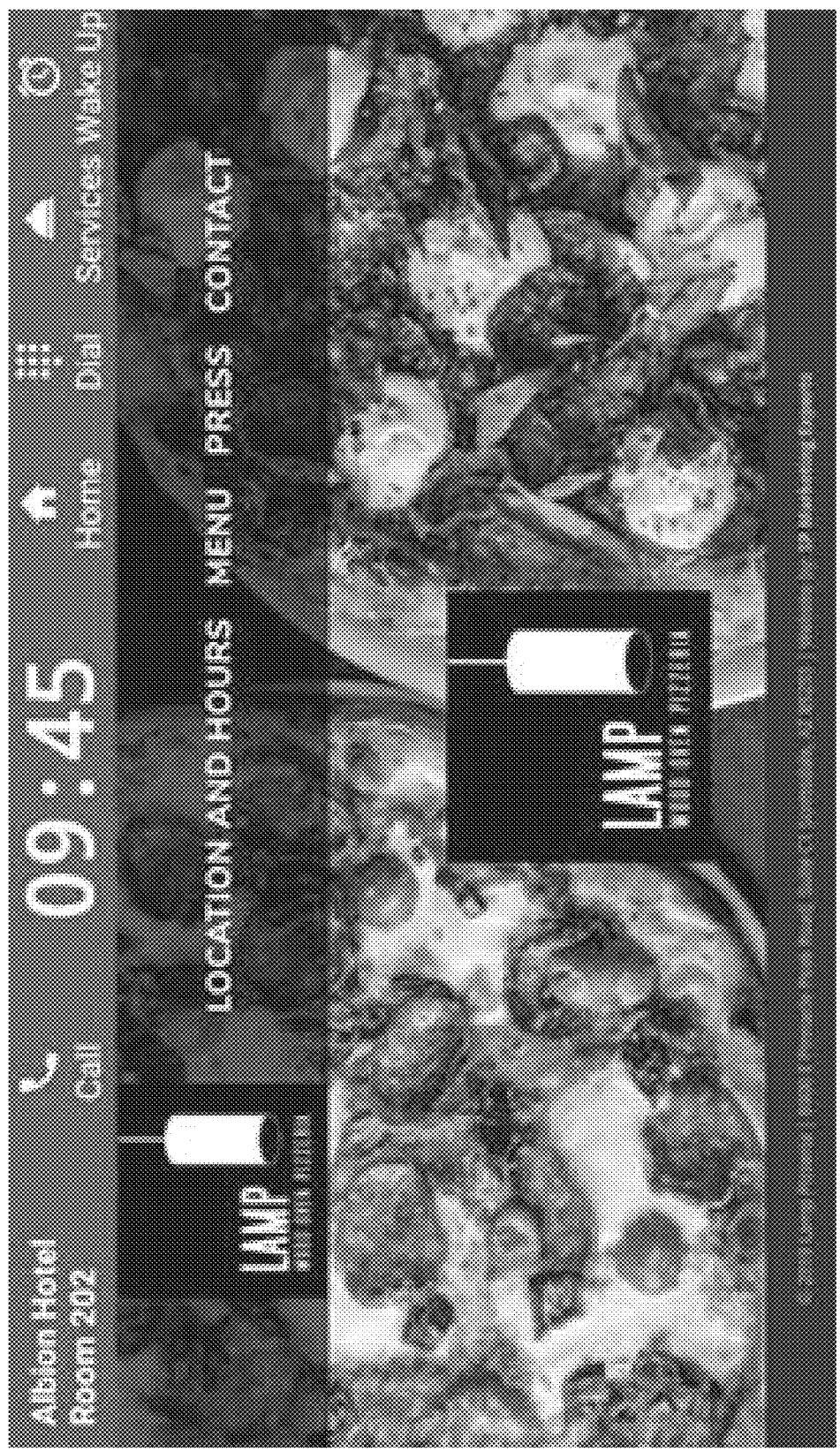
FIG. 4 is an example of a webpage that the system might present to a hotel guest at the touch display of the in-room telephone of FIG. 2, in response to the hotel guest touching a logo on the touch display.

As mentioned above, when a hotel guest touches a particular one of the logos on the home screen of FIG. 3, the system 100 causes the touch display 222 to navigate to a page/website associated with the business that corresponds to the selected logo. FIG. 4 is an example of a webpage that the system might present to a hotel guest at touch display 222 in response to the hotel guest touching a logo. The webpage shown in the illustrated example is for a wood over pizzeria called Lamp™ in Scottsdale Ariz. The webpage has text on it that act as hyperlinks to other pages on the Lamp™ pizzeria website including "location and hours," "menu," "press," and "contact." The touch display 222 on the in-room telephones enable the hotel guest to navigate to those other pages by touching the display screen 222 where those text entries appear.

As one might expect given the intuitive nature of the screen of FIG. 4, touching the "location and hours" hyperlink causes the touch display 222 to navigate to a page on the Lamp™ pizzeria website that includes information about the location and hours of the Lamp™ pizzeria. Likewise, touching the "menu" hyperlink causes the touch display 222 to navigate to a page on the Lamp™ pizzeria website that includes the menu for the Lamp™ pizzeria. Touching the "press" hyperlink causes the touch display 222 to navigate to a page on the Lamp™ pizzeria website that includes articles and the like from the press about the Lamp™ pizzeria. Finally, touching the "contact" hyperlink causes the touch display 222 to navigate to a page on the Lamp™ pizzeria website that includes information about ways to contact the pizzeria (e.g., phone number, etc.).

In some implementations, the touch display 222 may present the phone number of the business (e.g., the Lamp™ pizzeria) in such a manner that, if the hotel guest, for example, touches the screen of the touch display where the phone number appears, the in-room telephone 104 dials the number directly. Of course, in some implementations, the website may allow the hotel guest to fill-in a reservation request form through the website—using either the keypad 234 (if available) or an on-screen, virtual keypad (see, e.g., FIG. 5) that can be called up for use by the hotel guest as needed.

Thus, in a typical implementation, hotel guests can use the in-room telephones 104, and the functionalities made available through their interactive touch displays, to not only learn about local restaurants and other businesses, but to contact and interact with those local restaurants and businesses directly and very easily.

Figure 5:
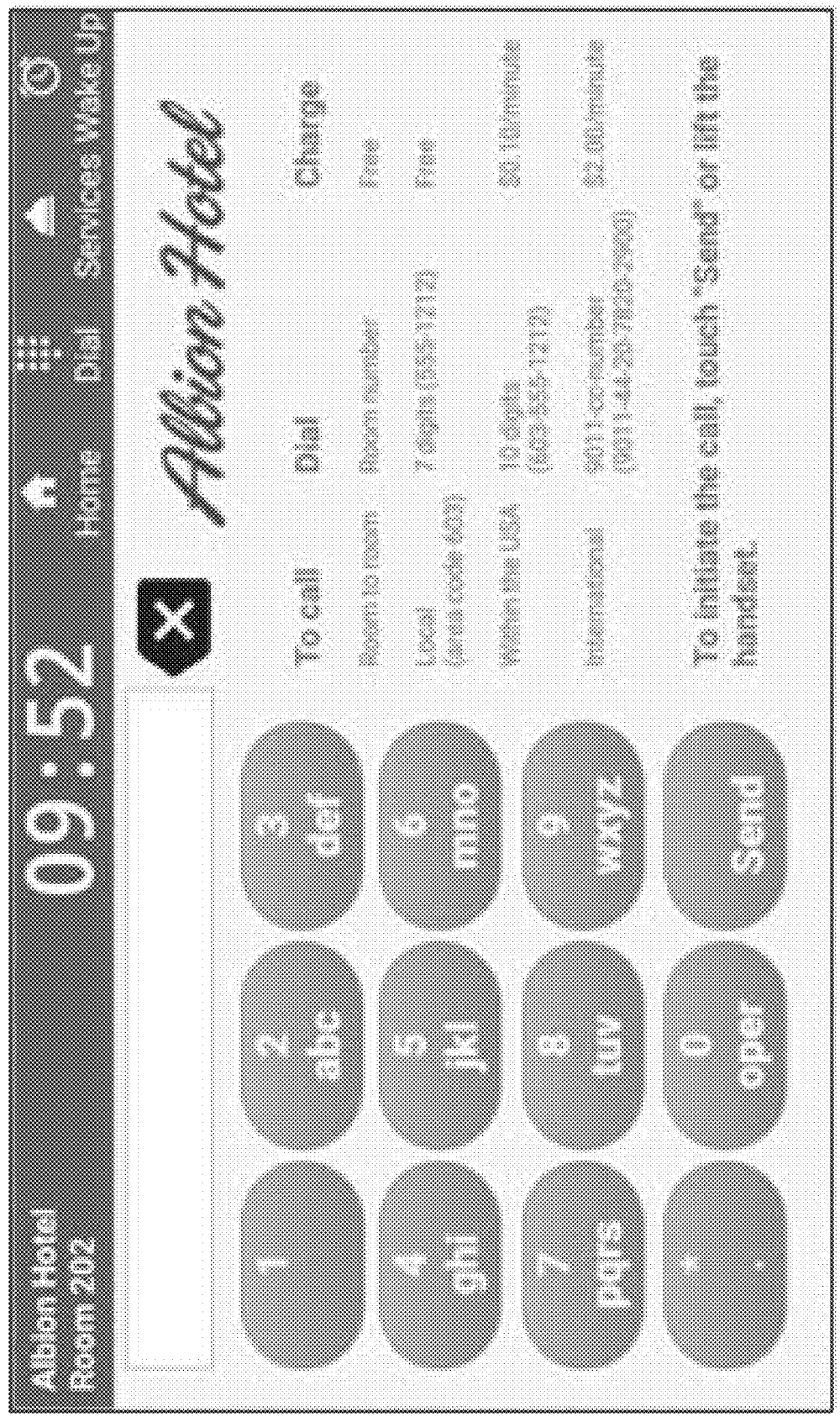
FIG. 5 is an example of a dial screen that might appear on the touch displays of the in-room telephone of FIG. 2 if, for example, a hotel guests touches the icon labeled "dial" in the header of a screen on the touch display.

FIG. 5 shows an example of a dial screen that might appear on the touch displays 222 of the in-room telephones 104 in system 100 if, for example, a hotel guests touches the icon labeled "dial" in the header of any screen.

The dial screen can have any one of a variety of possible appearances/configurations. In the illustrated example, the body of the dial screen has a left side that includes a blank field for entering a phone number and a virtual dial pad below the blank phone number entry field. The right side of the body of the dial screen, in the illustrated example, has the name of the hotel (the "Albion Hotel"), instructions on how to dial and initiate various types of calls (e.g., room to room, local, within the USA, and International) and the charges, if any, that would apply to making those calls. In use, a hotel guest, for example, might touch the phone number entry field, enter the desired phone number by touching the virtual dial pad, and touch the send button on the virtual dial pad to initiate the call.

Figure 6:
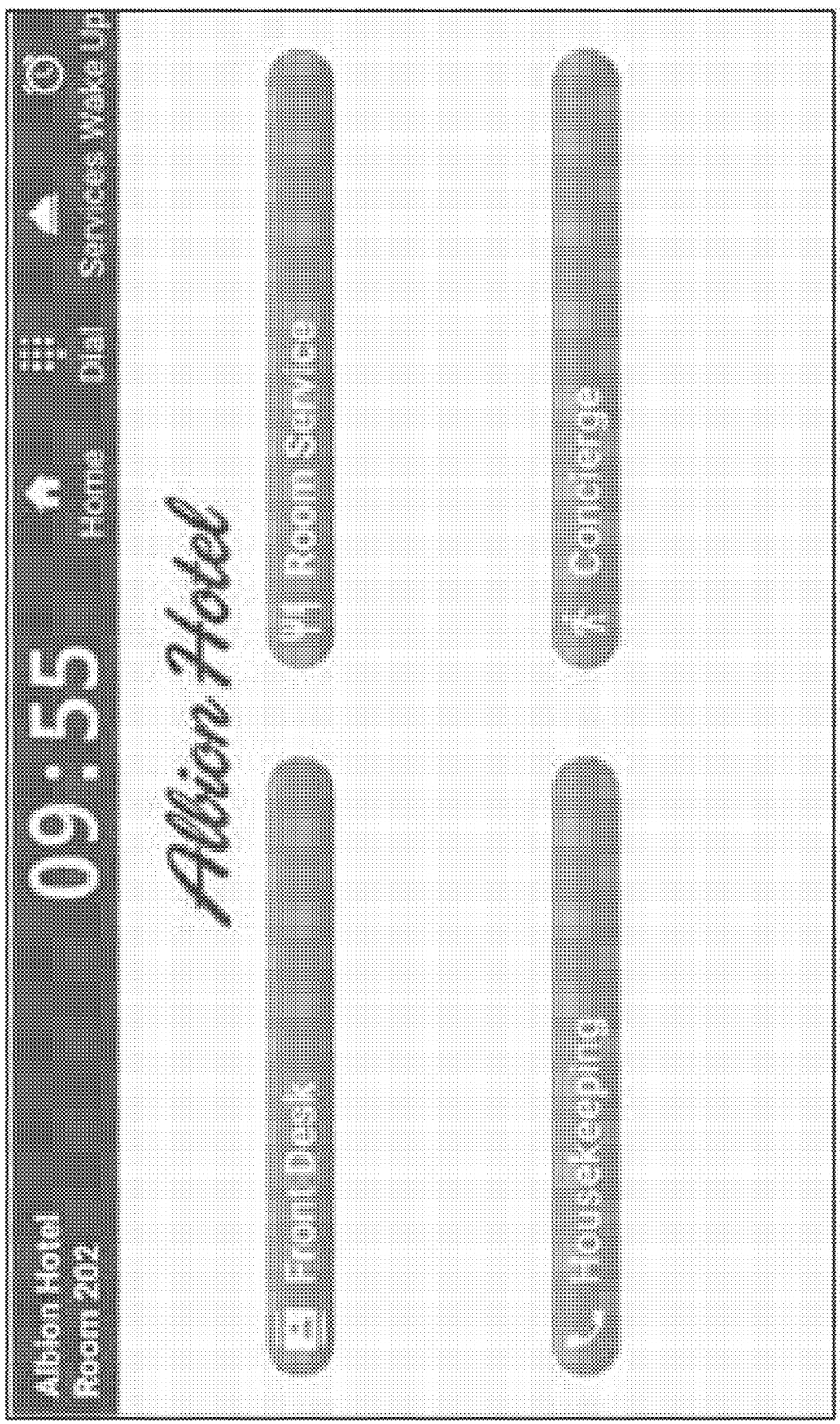
FIG. 6 is an example of a services screen that might appear on the touch display of the in-room telephone of FIG. 2 if a hotel guest, for example, touches the icon labeled "services" in the header of a screen on the touch display.

FIG. 6 shows an example of a services screen that might appear on the touch displays 222 of the in-room telephones 104 in system 100 if, for example, a hotel guest touches the icon labeled "services" in the header of any screen.

The services screen can have any one of a variety of possible appearances/configurations. In the illustrated example, the body of the services screen has four buttons, respectively labeled "front desk," "room service," "housekeeping," and "concierge." In various implementations, the services screen can include more or fewer, or just a different selection of buttons related to services available from the hotel, typically provided by hotel staff.

As one might expect given the intuitive nature of the screen of FIG. 6, touching the "front desk" button may cause the in-room telephone 104 to dial the front desk or may cause the touch display 222 to navigate to a page with information about and/or options for contacting the front desk. Likewise, touching the "room service" button may cause the in-room telephone 104 to dial for room service or may cause the touch display 222 to navigate to a page with information about and/or options for contacting or ordering from room service. Touching the "room service" button may cause the in-room telephone 104 to dial for room service or may cause the touch display 222 to navigate to a page with information and/or options for contacting or ordering from room service. Similarly, touching the "housekeeping" button may cause the in-room telephone 104 to dial for housekeeping or may cause the touch display 222 to navigate to a page with information about and/or options for contacting or making requests for housekeeping. Finally, touching the "concierge" button may cause the in-room telephone 104 to dial the concierge or may cause the touch display 222 to navigate to a page with information about and/or options for contacting or making requests from the hotel concierge.

Figure 7:
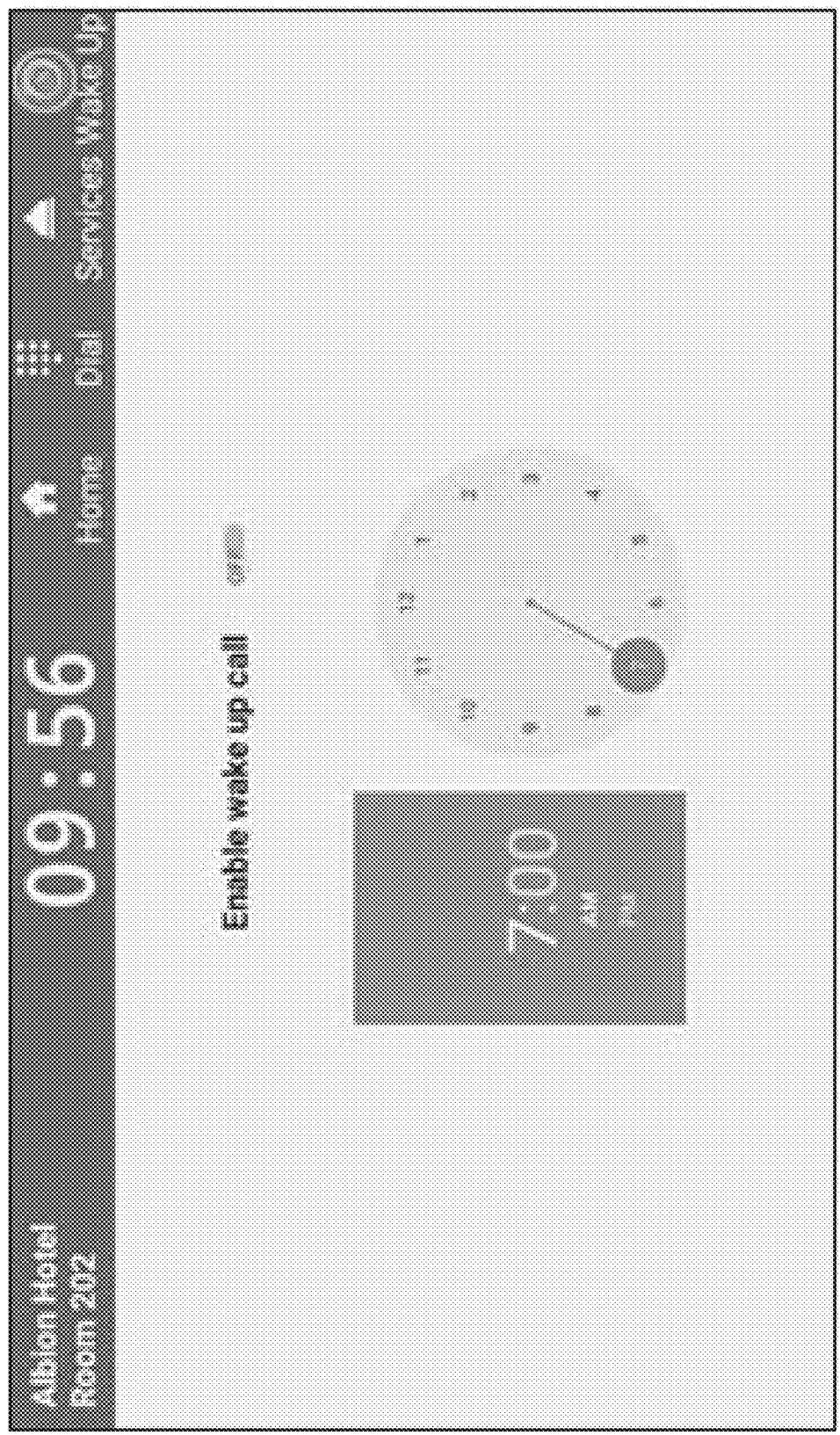
FIG. 7 is an example of a wake up screen that might appear on the touch display of the in-room telephone of FIG. 2 if a hotel guest, for example, touches the icon labeled "wake up" in the header of a screen on the touch display.

FIG. 7 shows an example of a wake up screen that might appear on the touch displays 222 of the in-room telephones 104 in system 100 if, for example, a hotel guest touches the icon labeled "wake up" in the header of any screen.

The wake up screen can have any one of a variety of possible appearances/configurations. In the illustrated example, the body of the wake up screen has a virtual slider switch and a text label indicating that the virtual slider switch can be manipulated to "enable wake up call" functionality. Sliding the switch does what the text indicates— enable (or disable) wakeup call functionality on the phone. Beneath the virtual slider switch and the textual label is a virtual digital clock (set for "7:00 AM") and a virtual analog clock (set for "7:00"). If a hotel guest enables wakeup call functionality, by sliding the virtual slider switch to an enabled position, and leaves the clocks in the positions shown, the hotel guest would receive a wake-up call at 7:00 AM. In some implementations, the telephone 104 (or the system 100) provides a recorded wake-up call automatically (e.g., without the need for human intervention at all). In some implementations, the hotel guest enabling wakeup call functionality adds a wakeup call request (with the corresponding time) to an electronic log that a human hotel staff member can use to make wake-up calls at the requested times.

In a typical implementation, much of the information that appears on the touch displays 222 of the in-room telephones 104 can be customized and configured by hotel staff. This customization and configuration can be performed from the computer control terminals 112a . . . 112n. For example, in a particular implementation, the system 100 is be configured to present a various components to hotel staff at the computer control terminals 112a . . . 112n that enable the hotel staff to make system customizations or configurations. In some such implementations, there is a web application, or the like, that enables the control terminals 112a . . . 112n to present to the hotel staff different components that allow the hotel staff to customize/configure/control the system 100 and the touch displays 222 in the system 100. In this regard, the web application typically includes the following components telephone settings 114, telephone advertisements 116, guest wake-up calls 118, and/or reports on phone usage, etc. 120.

In a typical implementation, the telephone settings component 114 at the control terminals 112a . . . 112n enables hotel staff to configure the operation of certain non-advertisement aspects of the in-room telephones' functionalities. This information that system 100 might prompt the hotel staff member to enter, in this regard, might include, for example, one or more of the following: branding information for the hotel such as its name and logo, charges for various forms of dialing (including outbound dialing), the amount of time to automatically dim the room phone touch display and to restore it to full brightness, hotel services that should be shown on the in-room telephone phone 'Services' screen, the icons to use to display those services, etc.

In some implementations, the telephone settings component may present to the hotel staff member a screen that includes one or more fields that correspond to the different types of information listed above. Some of those fields may include drop down menus to facilitate entering information that the system can use to control the phones. In some implementations, the telephone settings are the same for every telephone in the hotel. In some implementations, the telephone settings may be customized so that different telephones in different rooms can have different telephone settings. The telephone settings entered at the control terminals 112a . . . 112n are typically saved by the system 100 (e.g., in the computer-based memory 110 of server 106) for use by the system 100 (e.g., by the computer-based processor 108 of server 106) to control the telephones 104.

In a typical implementation, the advertisements component 116 at the control terminals 112a . . . 112n enables hotel staff to configure the advertisements to be shown on the touch displays 222 of the in-room telephones 104. In some implementation, the advertisements component also allows the hotel staff to control the order in which the advertisements are displayed and to enable and disable individual advertisements. In one example, the order that the advertising logos are arranged on the screen of the control terminals 112a . . . 112n is the order in which the corresponding advertisements will appear on the in-room telephone(s). Advertisement information that the system 100 prompts hotel staff to provide or specify typically consists of three pieces of information: 1) a graphic (e.g., logo) to display on the main display page of the telephones 104, 2) website URLs for the websites that are to be displayed at touch displays 222 of the telephones 104 in response to a user (e.g., a hotel guest) touching a graphic or logo; and 3) a telephone number for calling the advertiser (i.e., the business that corresponds to the graphic or logo). In various implementations, the system 100 may be configured to prompt or request or require hotel staff to enter more or less information about the businesses to be featured at the touch displays 222 of the in-room telephones 104.

In some implementations, the advertising component may present to the hotel staff member a screen that includes one or more fields that correspond to the different types of advertising information listed above. Some of those fields may include drop down menus to facilitate entering information that the system can then use to control the phones. In some implementations, the advertisement settings are the same for every telephone in the hotel. In some implementations, the advertisement settings may be customized so that different telephones in different rooms can have different advertisement settings. The advertisement settings entered at the control terminals 112a . . . 112n are typically saved by the system 100 (e.g., in the computer-based memory 110 of server 106) for use by the system 100 (e.g., by the computer-based processor 108 of server 106) to control the telephones 104.

In a typical implementation, the wake-up calls component 118 at the control terminals 112a . . . 112n enables hotel staff to see pending wake-up call requests from hotel guests and, if needed, to schedule wake-up calls for guests. In this regard, the system 100 may present an electronic log of wake-up call requests to the hotel staff member at the control terminal 112a . . . 112n. In some implementations, if the system is set up to provide automated wake-up calls to the hotel guests, the wake-up calls component 118 at the control terminals 112a . . . 112n may simply present a list at the control terminals 112a . . . 112n of the requested wake-up calls.

In a typical implementation, the room report component 120 at the control terminals 112a . . . 112n displays a report of calling activity and charges for a given room (e.g., during a particular guest's stay in that room of the hotel. In one example, this report may include a simple chronological listing of the calls made from a given room, the duration of each call, the charges that apply to that call, and a total of charges. The report also may include the room number, guest's name, and/or other information. Other implementations are possible too.

The application (e.g., the interactive web application) that makes these various components (114, 116, 118, 120) available at the control terminals 112a . . . 112n may reside on the specific control terminals 112a . . . 112n or on the server 106. That application typically interacts with the database 110 of the local server 108 to retrieve and store information. For example, when a particular in-room telephone 104 starts up, the application on the phone uses the phone's VoIP configuration to determine the location of the advertising configuration server (e.g., 106), and then contacts that server 106 via HTTPS to download its configuration parameters. The configuration parameters may include, for example, the graphics (e.g., logos) to display on the main display page of the telephones 104, website URLs for the websites that are to be displayed at touch displays 222 of the telephones 104 in response to a user (e.g., a hotel guest) touching a graphic or logo; and 3) the telephone numbers for calling the advertisers (i.e., the businesses that correspond to the graphics or logos). The configuration parameters, which would have been entered by hotel staff, are generally stored in a database (e.g., on 110). The server 106—through its processor 108—typically parses that configuration information into a form suitable for use by the in-room telephones 104 and the parsed configuration information is downloaded to the in-room telephones 104. The room phone then initializes or updates its displays with the received information.

FIG. 8 is a schematic representation of an exemplary computer-based memory and processing system 812. This exemplary computer-based memory and processing system 812 may represent an implementation of the control terminals 112a . . . 112n and/or the server 106.

The illustrated computer-based memory and processing device 812 has a computer-based processor 808, a computer-based storage device 810a, a computer-based memory 810b with software 807 stored therein that, when executed by the processor 808, causes the processor 808 to provide functionality to support system 100 operations as described herein, input and output (I/O) devices 809 (or peripherals), and a local bus or interface 811 that allows for internal communication within the computer-based memory and processing device 812. The local interface 811 can be, for example, one or more buses or other wired or wireless connections. In various implementations, the computer-based memory and processing device 812 may have additional elements, such as controllers, buffers (caches), drivers, repeaters, and receivers, to facilitate communications and other functionalities. Further, the local interface 811 may include address, control, and/or data connections to enable appropriate communications among the illustrated components.

The processor 808, in the illustrated example, is a hardware device for executing software, particularly that stored in the special software in memory 810b. The processor 808 may be custom made and may be a single core or multi-core processor, a central processing unit (CPU), an auxiliary processor among several processors associated with the present server 102, a semiconductor based microprocessor (in the form of a microchip or chip set), a macroprocessor, or generally any device for executing software instructions. In addition, the processing function can reside in a cloud-based service accessed over the internet. The processor can include one or more processing devices and may be geographically distributed.

The memory 810b can include one or combination of volatile memory elements (e.g., random access memory (RAM, such as DRAM, SRAM, SDRAM, etc.)) and/or nonvolatile memory elements (e.g., ROM, hard drive, tape, CDROM, etc.). Moreover, the memory 810b may incorporate electronic, magnetic, optical, and/or other types of storage media. The memory 810b can have a distributed architecture, with various memory components being situated remotely from one another, but accessible by the processor 808.

The software 807 includes one or more computer programs, each of which contains an ordered listing of executable instructions for implementing logical functions associated with the computer-based memory and processing system 812 (or computer system), to facilitate and/or perform functionalities described herein. The memory 810b may contain an operating system (O/S) 813 that controls the execution of one or more programs within the computer-based memory and processing system 812, including scheduling, input-output control, file and data management, memory management, communication control and related services and functionality.

The I/O devices 809 may include one or more of different types of input or output device. Examples include a keyboard, mouse, scanner, microphone, printer, display, etc. In some implementations, a person having administrative privileges, for example, may access the computer-based processing device (e.g., of one of the control terminals 112*a* . . . 112*n*) to perform administrative functions through one or more of the I/O devices 809.

In a typical implementation, the computer-based memory and processing device 812 also has a network interface (not shown in FIG. 8) that facilitates communication with one or more external components (e.g., server 106 and/or telephones 104) via a communications network. The network interface can be a physical computer-based interface device. In some instances, for example, the network interface may include one or more modulator/demodulators (i.e., modems); for accessing another device, system, or network), a radio frequency (RF) or other transceiver, a telephonic interface, a bridge, a router, or other device. During system operation, the computer-based memory and processing device 812 receives data and sends notifications and other data via the network interface.

Some of the concepts disclosed herein can be implemented in, or take the form of, a computer program product accessible from a computer-readable medium storing program code for use by or in connection with a computer or any instruction execution system. For the purposes of this description, a computer readable medium can be any tangible apparatus that can contain, store, communicate, propagate, or transport the program for use by or in connection with the instruction execution system, apparatus, or device. The medium can be an electronic, magnetic, optical, electromagnetic, infrared, semiconductor, or a propagation medium. Examples of a computer-readable medium include semiconductor or solid-state memories, magnetic tapes, removable computer diskettes, random access memory (RAM), read-only memory (ROM), rigid magnetic disks and optical disks including compact disk-read only memory (CD-ROM), compact disk-read/write (CD-R/W) and DVDs. The phrase computer-readable medium or computer-readable storage medium as used herein should be construed to include all mediums that are statutory (e.g., in the United States, under 35 U.S.C. § 101), and, in some instances, to specifically exclude all mediums that are non-statutory in nature to the extent that the exclusion is necessary for a claim that includes the computer-readable (storage) medium to be valid. Some or all of the computer-readable media or storage media can be non-transitory.

A number of embodiments of the invention have been described. Nevertheless, it will be understood that various modifications may be made without departing from the spirit and scope of the invention.

For example, this description refers to hotel staff configuring the system. However, other people, including someone from an organization outside of the hotel, could configure the system as well. In fact, the system could be configured by anyone that the hotel chooses to give access.

The specific design of the various screens that appear at the in-room telephones can, of course vary considerably from those shown and described herein. In addition, in various implementations, different features from different screens described herein may be combined to appear on the same screen. Likewise, certain features described herein as appearing on one screen could be separated into more than one different screen(s).

Any processor(s) described herein can be implemented as one or more than one processor. If implemented as more than one processor, the processors can be located in one facility (e.g., in the building or campus of the hotel) or distributed across multiple locations, some or all of which may be outside of the building or campus of the hotel. Likewise, any memory described herein can be implemented as one or more than one memory device. If implemented as more than one memory device, the memory devices can be located in one facility (e.g., in the building or campus of the hotel) or distributed across multiple locations, some or all of which may be outside of the building or campus of the hotel.

The system can be deployed in other non-hotel settings including, for example, hospitals, office buildings, motels, etc.

The specific businesses to be advertised on the in-room telephones can be virtually any kind of business. Typically, they will be somewhat local businesses, as determined by hotel staff, based on their own knowledge and/or hotel policies, and/or computer-based searching. The businesses can be local (e.g., within 1 mile, 5 miles, 10 miles, etc.) or not. The degree of locality may be decided upon based on the likelihood that a hotel guest might consider that business to be worth visiting during his or her stay at the hotel.

In some implementations, some of the telephones (referred to as in-room telephones herein) could be in common areas (e.g., hotel lobbies, hallways, conference rooms, dining areas, etc.) of the hotel.

The specific design of the in-room telephones can differ from what has been disclosed herein. For example, in some implementations, the in-room telephones will not have physical buttons to make phone calls and all phone calls will be made by interacting with, or touching, the touch display on those telephones. In some implementations, to dial an outside call, the hotel guest can touch the 'Dial' button or just lift the handset, at which point, a dial pad interface and/or buttons to reach specific hotel services will appear on the touch display.

The hotel guests can interact with the touch displays by touching the graphics on the touch display. In some implementations, this will bring the display to a website that has been configured for the advertised business and also display a button that allows the guest to immediately call the advertising establishment.

The server is described herein, and represented in the figures, as being a single server. However, in some implementations, the server can be implemented across multiple machines or servers, either local to or remote from the hotel. Moreover, a particular system may have any number (one or more) of control terminals.

Various aspects of the subject matter disclosed herein can be implemented in digital electronic circuitry, or in computer-based software, firmware, or hardware, including the structures disclosed in this specification and/or their structural equivalents, and/or in combinations thereof. In some embodiments, the subject matter disclosed herein can be implemented in one or more computer programs, that is, one or more modules of computer program instructions, encoded on computer storage medium for execution by, or to control the operation of, one or more data processing apparatuses (e.g., processors). Alternatively, or additionally, the program instructions can be encoded on an artificially generated propagated signal, for example, a machine-generated electrical, optical, or electromagnetic signal that is generated to encode information for transmission to suitable receiver apparatus for execution by a data processing apparatus. A computer storage medium can be, or can be included within, a computer-readable storage device, a computer-readable storage substrate, a random or serial access memory array or device, or a combination thereof. While a computer storage medium should not be considered to include a propagated signal, a computer storage medium may be a source or destination of computer program instructions encoded in an artificially generated propagated signal. The computer storage medium can also be, or be included in, one or more separate physical components or media, for example, multiple CDs, computer disks, and/or other storage devices.

Certain operations described in this specification can be implemented as operations performed by a data processing apparatus (e.g., a processor) on data stored on one or more computer-readable storage devices or received from other sources. The term "processor" (or the like) encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations may be described herein as occurring in a particular order or manner, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In various implementations, one or more of the devices disclosed herein may be configured to communicate wirelessly over a wireless communication network via any one or more of a variety of wireless communication protocols including, but not limited to, cellular communication, ZigBee, REDLINK™, Bluetooth, Wi-Fi, IrDA, dedicated short range communication (DSRC), EnOcean, and/or any other suitable common or proprietary wireless protocol.

Finally, instead of the touch displays (e.g., touch sensitive displays), the in-room telephones may have simply displays—and physical buttons on the phones (e.g., at the side of the display) may be used to select one of more of the displayed advertisements and to navigate through the various screens that the system may be able to produce at the in-room telephone.

Other implementations are within the scope of the claims.

What is claimed is:

1. A system comprising:
   a plurality of in-room telephones with integrated tablet-like touch displays in each one of a plurality of rooms;
   a computer-based server that is connected to the in-room telephones and interacts with the in-room telephones to provide configuration information to facilitate display of advertising information at the touch displays of the in-room telephones; and
   one or more computer control terminals connected to the computer-based server and operable to facilitate human control over various aspects of system operation including the advertising information displayed at the touch displays of the in-room telephones,
   wherein each of the in-room telephones is configured to display one or more logos of associated businesses on its touch display,
   wherein the one or more computer control terminals enable a human staff member to specify businesses whose advertising information is to be displayed at the touch displays of the in-room telephones,
   wherein the touch displays are configured to cycle through a selection of advertising information for businesses specified by the human staff member at one of the computer control terminals, and wherein cycling through the selection of advertising information comprises:
      showing no more than some set maximum number of logos on the touch displays at any given time; and
      periodically replacing some number of the logos being displayed at each of the touch displays with different logos.

2. The system of claim 1, wherein the system is deployed in a hotel and the in-room telephones are inside guest rooms of the hotel.

3. The system of claim 2, wherein the server is dedicated to the hotel and does not interact with any other telephones outside the hotel.

4. The system of claim 3, wherein at least one of the computer control terminals is located on the hotel premises.

5. The system of claim 1, wherein each logo on the display screen is a hyperlink to a different page or screen that corresponds to the business associated with the logo, such that if a human user touches a particular logo, the display screen will show the different page or screen that corresponds to the business associated with the touched logo.

6. The system of claim 5, wherein the different page or screen that corresponds to the business associated with the touched logo has a telephone number for the associated business or a button that can be touched by the human user to call the associated business.

7. The system of claim 1, wherein the businesses are businesses within 10 miles of the in-room telephones.

8. The system of claim 1, wherein each in-room telephone has, on its touch display, an icon, symbol or word that is a hyperlink that, if touched, causes the system to present, at the touch display:
   a page that includes one or more logos of associated businesses;
   a page that includes an interface that enables a human user to dial a phone number or initiate a phone connection to another phone;

a page that includes a way to reach hotel services including one or more of: a front desk, room service, housekeeping and/or concierge; and/or a page that enables setting a wake-up call request.

9. The system of claim 1, wherein the in-room telephones are Voice over Internet Protocol ("VoIP") telephones.

\* \* \* \* \*